(12) United States Patent
Hinkens et al.

(10) Patent No.: US 6,318,514 B1
(45) Date of Patent: Nov. 20, 2001

(54) DISC BRAKE SYSTEM WITH SPRING CLIP PAD HOLDERS

(75) Inventors: George H. Hinkens, Mequon; James A. Buckley, Whitefish Bay; Jeffrey S. Gohr, Menomonee Falls; Lee Pfeil, New Berlin, all of WI (US)

(73) Assignee: Hayes Brake, Inc., Mequon, WI (US)

( * ) Notice: Subject to any disclaimer, the term of this patent is extended or adjusted under 35 U.S.C. 154(b) by 0 days.

(21) Appl. No.: 09/469,041

(22) Filed: Dec. 21, 1999

Related U.S. Application Data

(60) Continuation-in-part of application No. 09/232,400, filed on Jan. 15, 1999, now Pat. No. 6,003,639, which is a division of application No. 08/920,495, filed on Aug. 29, 1997, now Pat. No. 5,950,772.

(51) Int. Cl.[7] ..................................................... F16D 65/40
(52) U.S. Cl. ..................................... 188/73.38; 188/73.32
(58) Field of Search ................................. 188/26, 73.31, 188/73.32, 73.35, 73.36, 73.37, 73.38, 72.3

(56) References Cited

U.S. PATENT DOCUMENTS

| | | | |
|---|---|---|---|
| 4,596,317 | * 6/1986 | Nagai et al. | 188/72.4 |
| 4,705,145 | 11/1987 | Goulart | 188/18 A |
| 4,858,728 | * 8/1989 | Thiel et al. | 188/73.31 |
| 5,529,150 | 6/1996 | Buckley et al. | 188/72.9 |
| 5,701,978 | * 12/1997 | Weiler et al. | 188/73.32 |
| 5,813,501 | 9/1998 | Terry, Sr. | 188/344 |
| 5,950,772 | 9/1999 | Buckley et al. | 188/26 |
| 6,003,639 | 12/1999 | Buckley et al. | 188/26 |

FOREIGN PATENT DOCUMENTS

| | | |
|---|---|---|
| 4324988 | * 2/1995 | (DE) . |
| WO-00/49307 | * 8/2000 | (DE) . |
| 2 017 236 A | 10/1979 | (GB) . |
| 2 056 601 A | 3/1981 | (GB) . |
| 59086724 | 5/1984 | (JP) . |

* cited by examiner

*Primary Examiner*—Matthew C. Graham
*Assistant Examiner*—Mariano Sy
(74) *Attorney, Agent, or Firm*—Boyle Fredrickson Newholm Stein & Gratz S.C.

(57) ABSTRACT

A disc brake assembly includes an improved pad holder for holding a brake pad in the brake assembly. The pad holder takes the form of a simple spring clip, preferably a wire form, that holds the rear surface of the pad tightly against the front surface of the piston or pistons of the associated caliper to prevent brake drag and brake rattle. The clip is simple and inexpensive to manufacture and can be easily installed without removing the disc or the caliper from the brake assembly. Indeed, the pad/pad holder subassembly can be removed from the brake assembly, without using any special tools, simply by imposing sufficient upward vertical retraction forces on the pad/pad holder subassembly to deflect the spring clip and to remove the pad holder from the pistons to which it is attached.

15 Claims, 16 Drawing Sheets

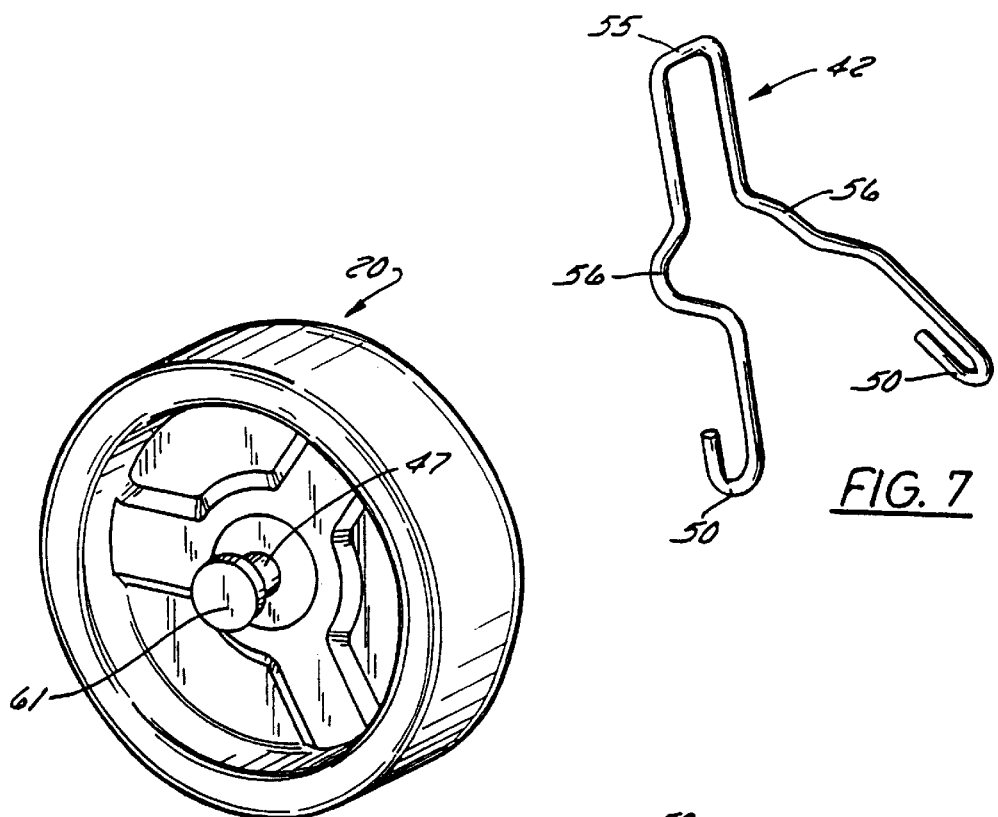
FIG. 7
FIG. 8
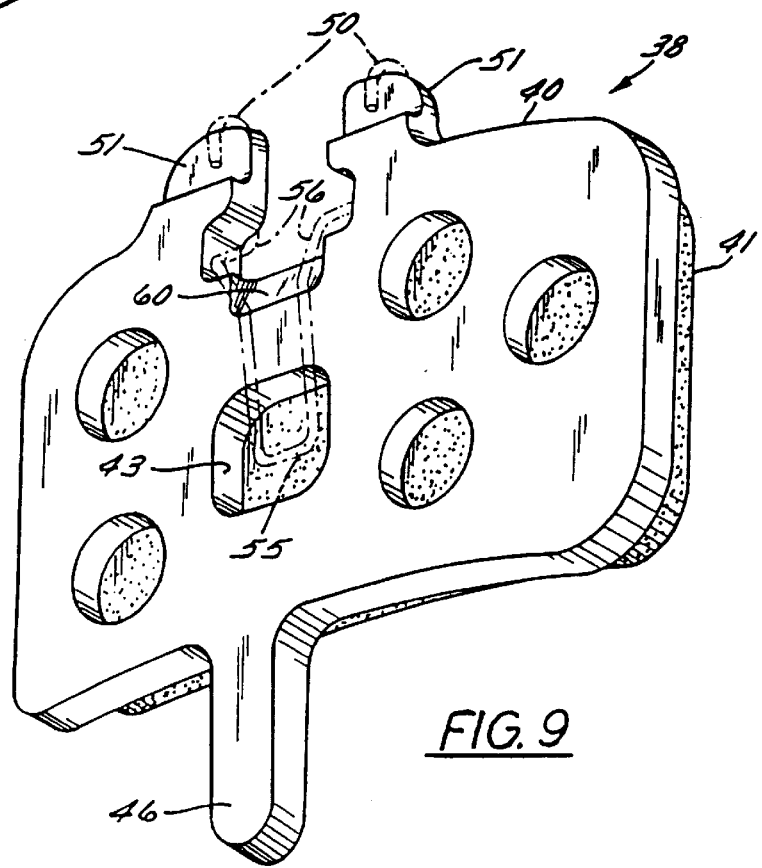
FIG. 9

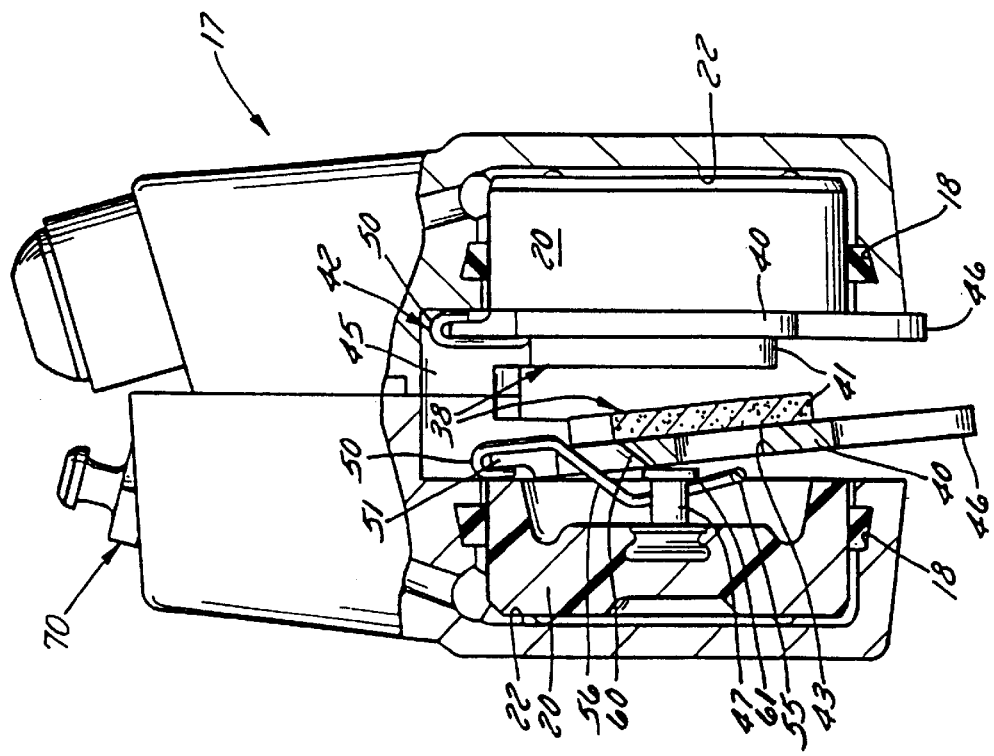
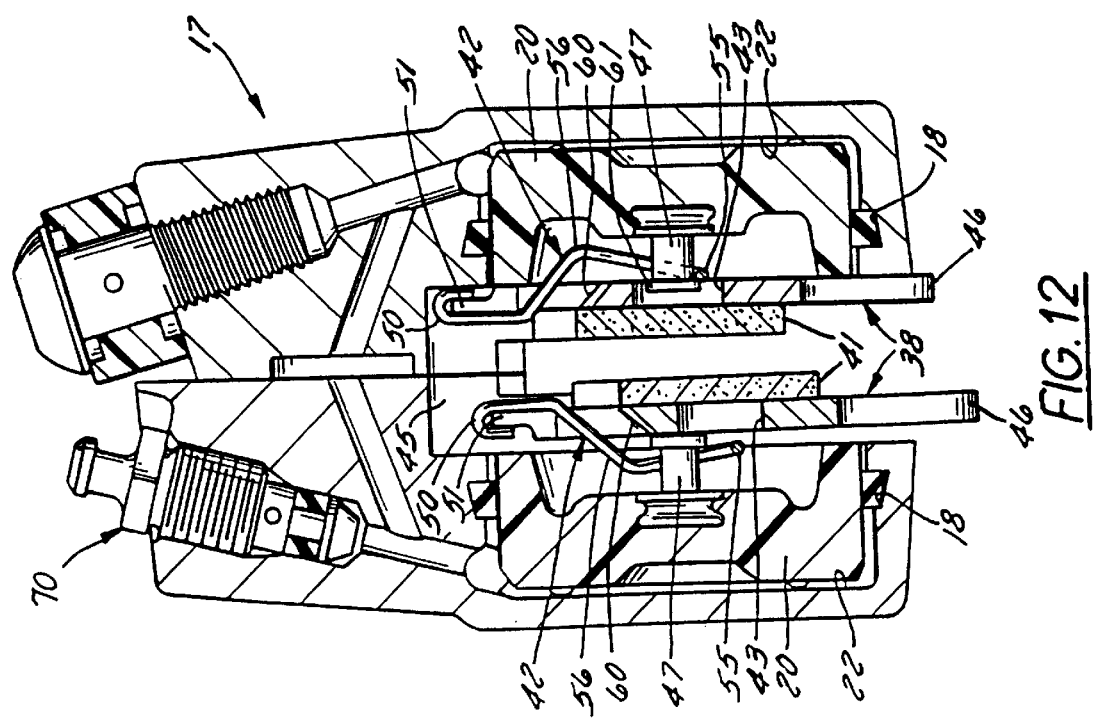

DISC BRAKE SYSTEM WITH SPRING CLIP PAD HOLDERS

CROSS REFERENCE TO RELATED APPLICATIONS

This application is a continuation-in-part to U.S. patent application Ser. No. 09/232,400, filed Jan. 15, 1999, now U.S. Pat. No. 6,003,639, which is a division of U.S. patent application Ser. No. 08/920,495, filed Aug. 29, 1997, now U.S. Pat. No. 5,950,772.

BACKGROUND OF THE INVENTION

1. Field of the Invention

The invention relates to disc brake systems and, more particularly, relates to a disc brake system having a brake pad retained in place within the system using a spring clip-type pad holder.

2. Discussion of the Related Art

Disc brake systems are used in a wide variety of applications such as bicycles, snowmobiles, golf carts, and automobiles. The typical disc brake system includes 1) a power source, such as a hydraulic master cylinder, and 2) a mechanical disc brake assembly that is actuated by the power source to apply the brake. The disc brake assembly includes a disc that rotates with the wheel, one or more brake pads, and one or more calipers each of which includes at least one piston that is selectively forced towards the disc by the power source to press the brake pad into frictional contact with the disc, thereby applying the brake.

The brake pads of a disc brake assembly are installed in the assembly using pad holders formed from any of a variety of structures such as retainer clips, bolts, and/or fastening lugs. Pad holders of these types are disclosed, for example, in U.S. Pat. No. 5,529,150, GB Patent No. 2,017,236, and GB Patent No. 2,056,601. These pad holders are typically of a relatively complex design, making them rather expensive to fabricate. They also tend to be relatively difficult to remove and install, usually requiring special tools and often requiring partial or complete removal of the caliper and/or disc from the assembly before the pad can be removed from the remainder of the assembly. Many are less than fully effective at holding the pad tight against the associated piston, thereby giving rise to drag and rattling problems.

One example of an application in which disc brake assemblies are the type of which the inventive pad holder is usable in bicycle brakes. However, many conventional disc brake assembly designs are not well suited for use on bicycles, particularly since bicycles are operated by both children and adults, are flipped upside down and laid on their sides, and are made to be of extremely light weight. Prior attempts at adapting motorcycle and automotive hydraulic disc brake technology to bicycles have fallen short due to this markets particular needs.

SUMMARY OF THE PRESENT INVENTION

The brake system described herein innovates a bleedable fluid reservoir with a bladder system that allows the atmospheric pressure reservoir to be drawn upon allowing the brake caliper piston to self adjust for pad wear without the potential of air ingestion and with room to expand the full volume in a high brake temperature condition. This system adapts a thermally compliant brake disk concept to an extremely lightweight embodiment for the bicycle industry yielding high torque carrying ability along with unparalleled thermal durability in a one piece design.

The system uses a ball joint piston design as shown in U.S. patent applications Ser. No. 08/638,526, entitled "Ball Joint Piston," and Ser. No. 09/044,276, entitled "Heavy Duty Brake Disc," to allow the smallest packaging for low weight and good wheel spoke clearance as well as eliminating the possibility of brake drag. This system demonstrates a user friendly lever adjustment to allow hand sizes from those of children to adults for comfort and safety. This lever adjustment avoids rattles and vibration effects with a rod backstop that reduces critical tolerances and whose piston and boot grip the mating push rod.

A unique post and piston assembly is coupled to a friction pad backing plate that uses a wire formed spring to secure the friction pad which both maximizes the disk to friction material clearance (eliminating any brake drag) while allowing an extremely easy pad change. This pad retention system also prevents the pads from falling out while transporting the bicycle with the wheel (and therefore the brake disk) out of the front fork. This system also prevents rattling noise by holding the friction pad backing plate tightly to the face of the brake piston.

In accordance with another aspect of the invention, an improved pad holder is provided for holding the brake pad in the brake assembly. The pad holder takes the form of a simple spring clip, preferably a wire form, that holds the rear surface of the pad tightly against the front surface of the piston or pistons of the caliper to prevent brake drag and brake rattle. The clip is simple and inexpensive to manufacture and can be easily installed without removing the disc or the caliper from the brake assembly. Indeed, the pad/pad holder subassembly can be removed from the brake assembly, without using any special tools, simply by imposing sufficient upward vertical retraction forces on the pad/pad holder subassembly to deflect the spring clip and to remove the pad holder from the pistons to which it is attached.

Other principal features and advantages of the invention will become apparent to those skilled in the art upon review of the following drawings, the detailed description and the appended claims.

BRIEF DESCRIPTION OF THE DRAWINGS

FIG. 7 is a perspective view of the pad spring;

FIG. 8 is a perspective view of the piston;

FIG. 9 is a perspective view of the friction pad and plate assembly;

FIG. 12 shows the beveled top of the pad ramped over the piston post;

FIG. 13 shows the pad partially removed from the housing disk slot;

Figure 1:
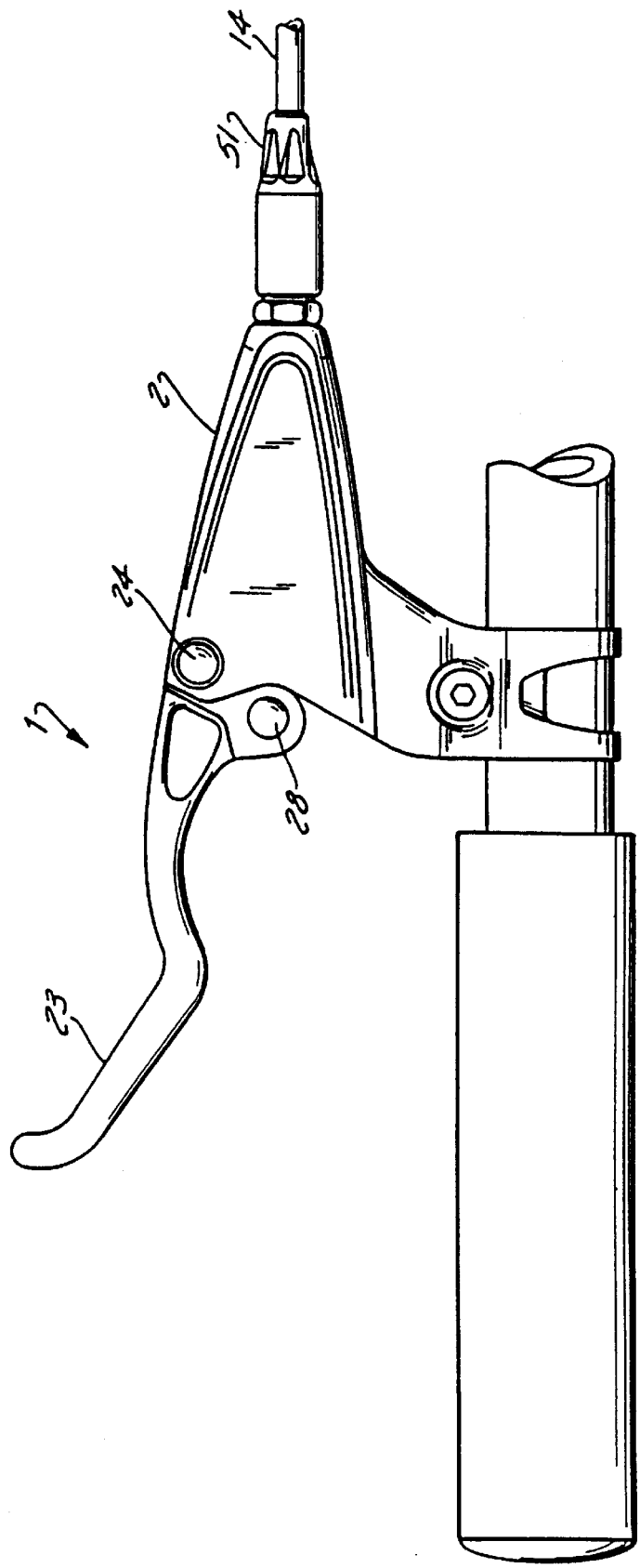
FIG. 1 is a side elevation view of the master cylinder shown mounted on the handlebar.

Before describing at least one embodiment of the invention in detail, it is to be understood that the invention is not limited in its application to the details of construction and the arrangement of the components set forth in the following description or illustrated in the drawings. The invention is capable of other embodiments or being practiced or carried out in various ways. Also, it is to be understood that the phraseology and terminology employed herein is for the purpose of description and should not be regarded as limiting.

DETAILED DESCRIPTION OF THE PREFERRED EMBODIMENTS

Figure 2:
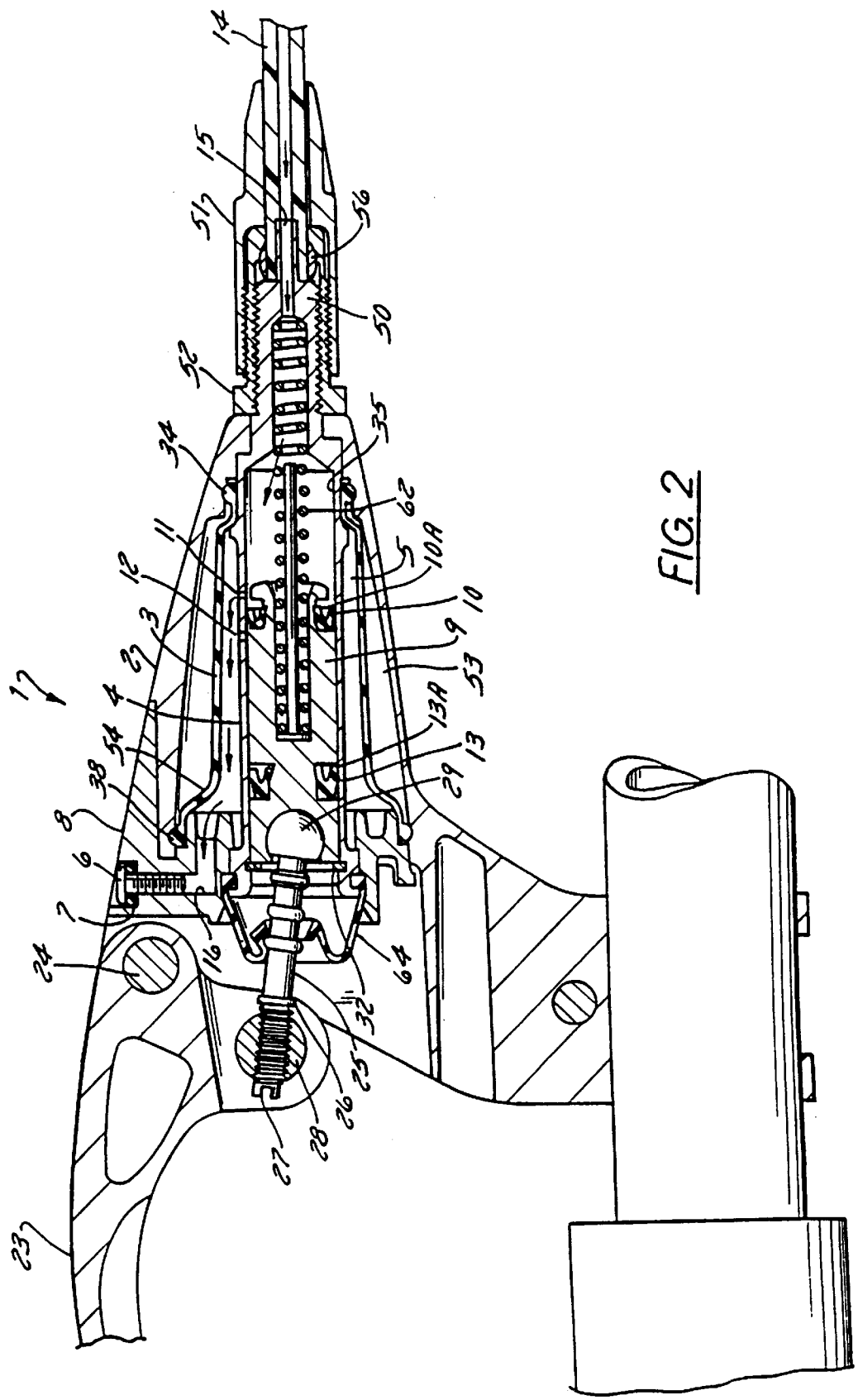
FIG. 2 is a cross-section view of FIG. 1 showing the adjustable push rod assembly (piston reservoir bladder, bleeder and compression fitting)
Figure 2B:
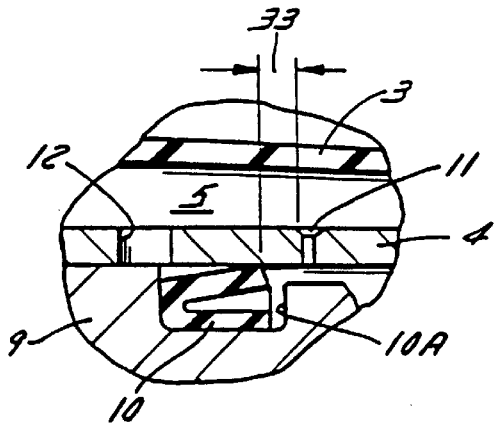
FIG. 2B is an enlarged view of the port timing opening and the fluid compensating openings.
Figure 3:
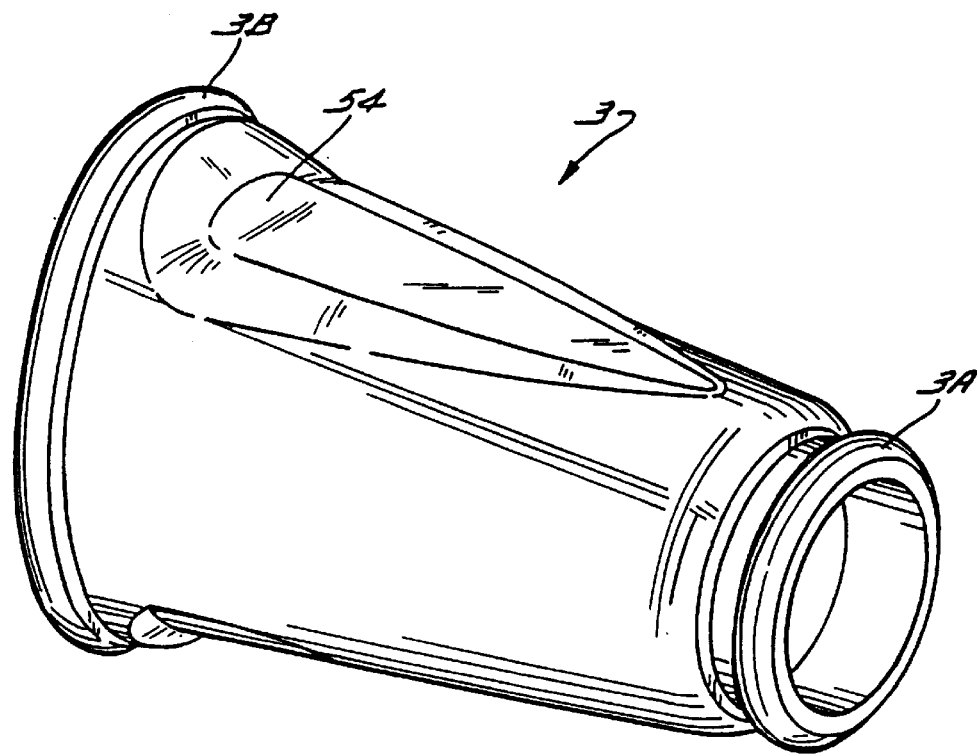
FIG. 3 is an external view of the reservoir bladder in its free state.

The master cylinder assembly 1 as shown in FIGS. 1 and 2 includes an outer housing 2 and an inner cylindrical body 4 mounted in the outer housing 2. A containment ring 8 is mounted on one end of the housing 2 for supporting one end of the cylindrical body. A rubber reservoir bladder 3 as shown in FIG. 3, has one end sealed to the inner end of the cylindrical housing 2 by a seal ring 3A and the other end secured to the containment ring 8 by the housing 2. An air space 53 is provided between the bladder 3 and the housing 2. The cylindrical body 4 is mounted in a spaced relation from the bladder 3 to form a fluid reservoir 5. A bleeder screw 6 is mounted in a threaded bleeder port or hole 16 in the containment ring 8 and sealed therein by an O-ring seal 7. A piston 9 is axially aligned in the cylindrical body 4 and retained therein by means of a snap ring 32. A spring 62 is aligned with the piston 9 to bias the piston to the open position in contact to the O-ring 32. A primary cup seal 10 is aligned in a groove 10A in the end of the piston 9. Referring to FIG. 2B a port timing hole 11 is provided in the cylinder 4 downstream from the cup seal 10. A fluid compensating hole 12 is provided in the cylindrical body 4 upstream from the groove 10A.

Figure 10:
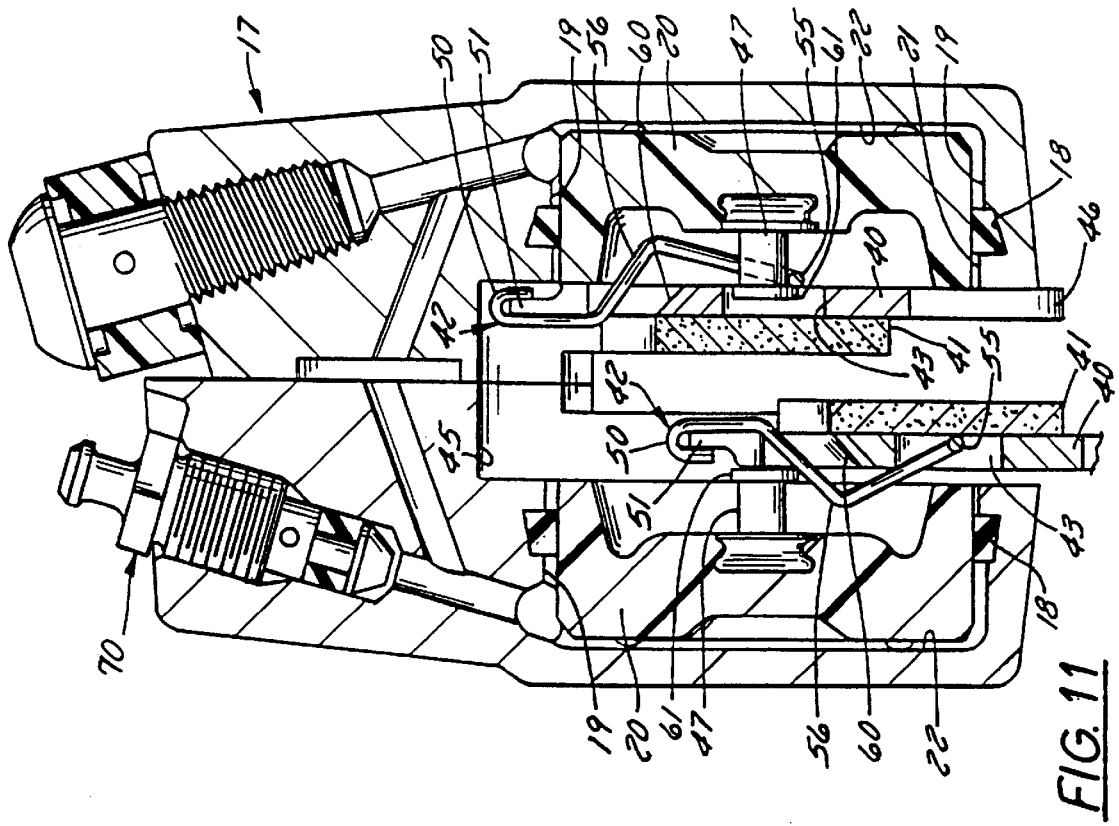
FIG. 10 is a cross-section view of the brake caliper assembly.

The cross-section of the housing 2 shown in FIG. 2 shows the state of the bladder 3 in a normal operating position. The bladder 3 is filled with fluid from the brake bleeder valve 70 as shown in FIG. 10 and is devoid of air. An air space 53 is provided outside the bladder 3 to allow for fluid expansion of the bladder that occurs during heavy braking as the fluid is heated. There is adequate reserve fluid volume within the bladder 3 to allow for brake piston adjustment outward to compensate for brake pad wear. The system is designed to provide an air space 53 between the bladder 3 and the housing 2. The fluid volume of the bladder 3 is determined by virtue of the shape of the bladder 3.

In this regard a perspective view of the bladder 3 is shown in FIG. 3 in its free state. The side walls of the bladder 3 are provided with indentations or dimples 54 which allow the bladder in the housing 2 to compensate for the expansion and contraction of the brake fluid.

Referring to FIG. 2, the system filling process is shown wherein brake fluid enters the cartridge body 4 from the brake line 14 through an inlet 15 formed at the end of the cartridge body 4. A threaded connector 52 is mounted on the threaded end 50 of the housing 4. A threaded cap 51 matingly engages the outer threaded end of connector 52. A seal 56 is provided on the inner end of connector 52 to seal the end of the brake line 14. A spring 62 is seated in the threaded end of the cartridge body 4.

The brake fluid flows through the timing port 11 carrying the system air with it and filling the bladder 3 with fluid. The air in the bladder 3 flows out through the open bleeder port 16. As this flow continues all air trapped in the system is exhausted out of the bleeder port 16. A slight flow restriction at the bleeder port 16 causes a slight fluid pressure rise which expands the dimples 54 in the bladder 3 outwardly. When the fluid source is shut off, the bleeder port 16 in the containment ring 8 is left open to allow the bladder 3 to relax into its original shape as shown in FIG. 3, exhausting a slight amount of fluid out through bleeder port 16. The bleeder screw 6 is closed and sealed by an O-ring 7 when the proper volumes of fluid and air are provided by the molded shape of the bladder.

Since the fluid system has no air in it, the bike can be bounced, laid on its side and turned upside down with no air ingestion problem or other negative effects that would be suffered by traditional reservoir type master cylinders or other so-called systems.

Figure 2A:
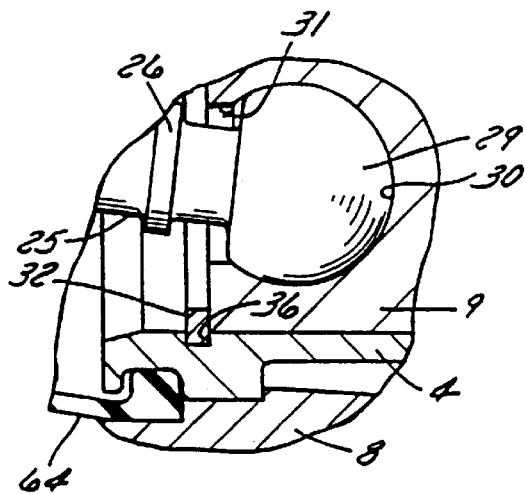
FIG. 2A is an enlarged view of the ball end and snap ring arrangement.

Referring to FIGS. 2 and 2A and particularly to the lever 23 which is pivotally connected to the housing 2 by means of pivot pin 24. In this regard a push rod 25 interconnects the lever 23 to the piston 9. A stop flange 26 is provided on the rod 25 and a slot 27 is formed on the outer end of the push rod 25. An adjustor bushing 28 is provided on the outer end of the push rod 25. A ball 29 is provided on the other end of the push rod 25 which is seated in a piston socket 30 as shown in FIG. 2A. Piston socket snap fit beams 31 are provided around the ball 29 and retained therein by the snap ring 32.

The lever position adjustment as shown in FIG. 2B is accomplished without affecting the critical clearance 33 between the primary seal at 10 and the timing port 11 as shown in FIG. 2B. The push rod 25 can be rotated by a screwdriver aligned with slot 27 at the end of the rod 25. As the rod 25 is rotated the adjustor bushing 28 travels down the rod 25, moving the lever 23 with it. The most extreme adjustments are limited by flange 26 formed on the rod 25 in one direction and the screw slot 27 entering the adjustor bushing 28 in the other direction.

The lever 23 maintains its adjustment through a friction hold. The adjustor bushing's first thread is an interference thread to the rod 25. A boot 64 is tightly mounted on the rod 25 and the outer end of the cylindrical body 4 to enclose the open end of the cylindrical body 4.

The piston 9 is prevented from exiting the bore 35 by means of a snap ring 32 which is retained in a groove 36 in the end of the cartridge body 4. The rod 25 is kept from being loose in the piston 9 by the use of the resilient piston material whose snap joint beams 31 are sprung to interfere with the rod ball end 29 as shown in FIG. 2A. The rod ball end 29 is prevented from exiting the piston by the beams 31 that will not open wide enough to allow the rod ball end 29 to escape due to contact with the bore 35. Therefore, in the free state the rod 25 can be snapped into the piston 9. Removal of the rod ball end 29 is prevented by the restriction of movement the bore 30 provides.

Figure 4:
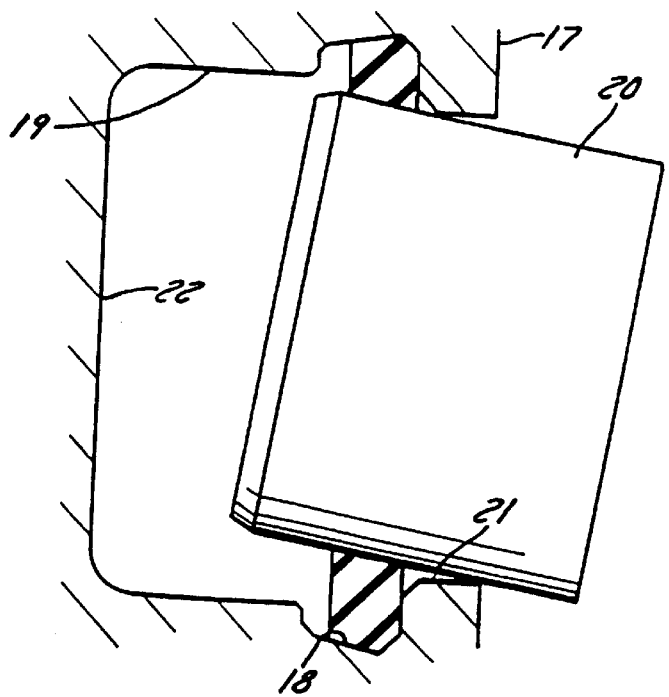
FIG. 4 is a view of a piston and an angular attitude to the caliper bore.
Figure 5:
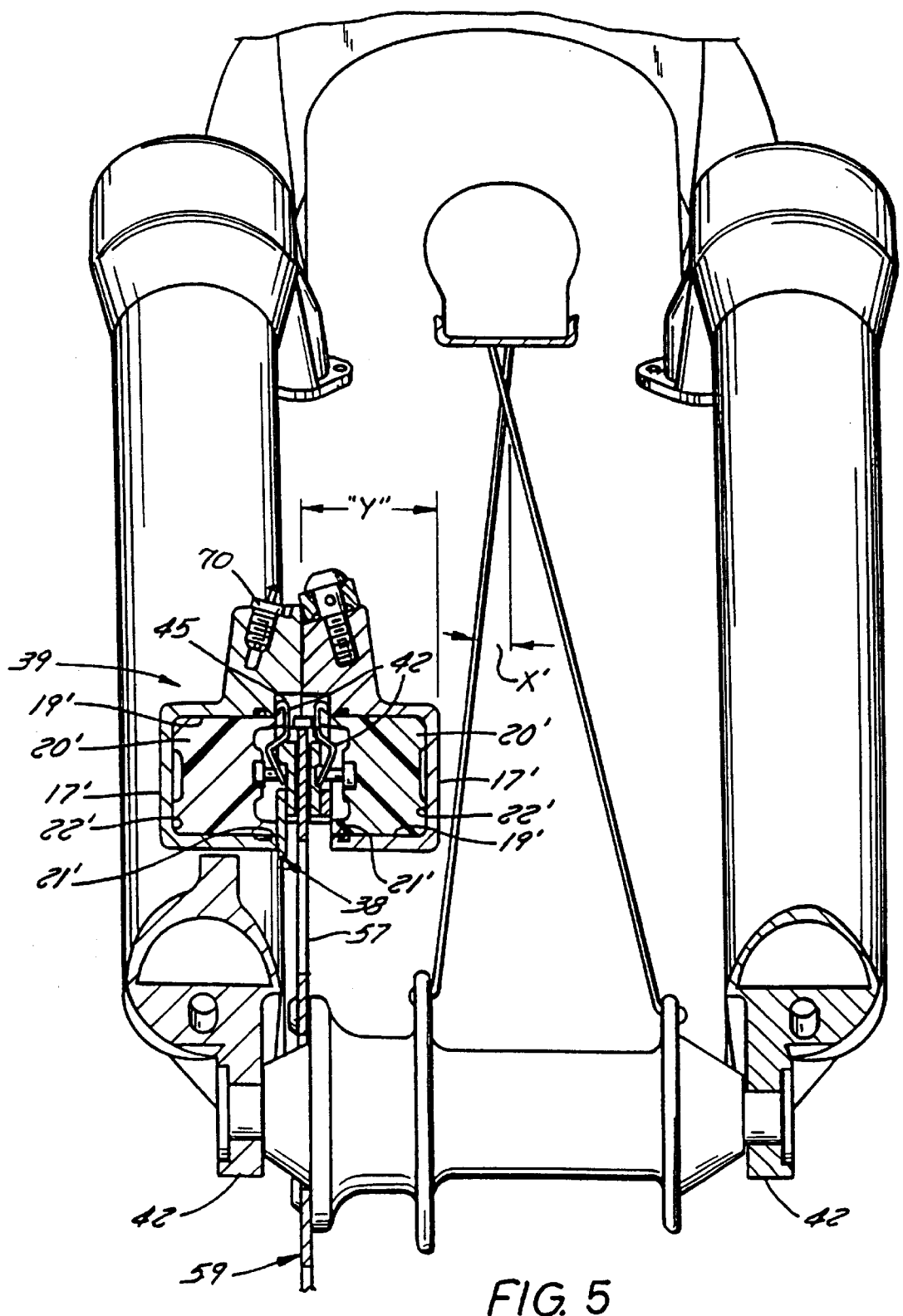
FIGS. 5 and 6 show the contrast in spoke angle achievable with standard pistons versus the ball joint piston to bore geometry.
Figure 6:
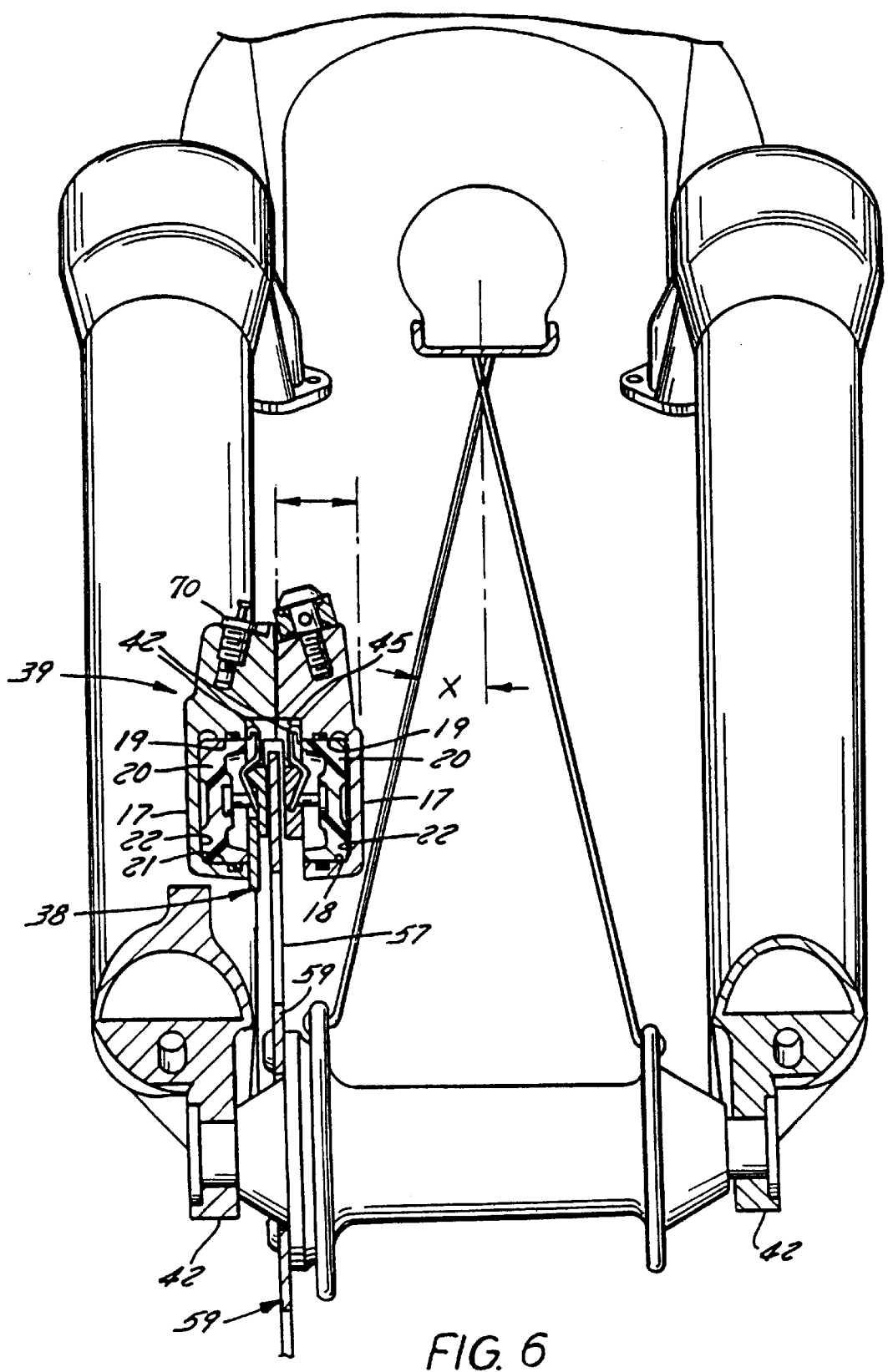

In FIGS. 4, 5 and 6 brake caliper housings 17 and 17' are shown having angularly machined seal grooves 18 and 18', an undercut bore 19 and a piston 20 in each bore 19. The engagement length of the pistons 20 to the bore land area 21 is made to be extremely short so as to allow the pistons to be angularly offset as shown in FIG. 4. This allows the pistons 20 to be designed with a length adequate only for sealing the piston 20 through the full cycle of a friction pad's wear as shown in FIG. 6 rather than needing a longer engagement as shown in FIG. 5 to resist jamming by sticking in the bore. This shortens the necessary bore depth 22 and allows for a greater spoke angle x of the wheel as shown in FIG. 6 than at the spoke angle x' of FIG. 5. This allows for a wheel with greater lateral strength which is important in rough riding. The piston and bore design also allows for smaller, lighter parts which is important for human powered vehicles.

Referring to FIGS. 7, 8, and 9, a friction pad and back plate assembly 38 is shown which includes a backing plate 40 having a tab 46 for inserting and removing the assembly 38 from the piston 20. A friction pad 41 is formed on one side of the friction plate 40. A flexion spring 42 is mounted on the plate 40. The spring 42 includes a hook 50 on each end which snaps onto ears 51 on the plate 40. A U-shaped loop 55 is provided intermediate the ends of the spring 42 and an offset section 56 on each leg of the spring which is aligned with a groove 60 in the plate 40. In the installed condition the plates 40 are held snugly against the pistons 20 by the springs 42.

Figure 11:
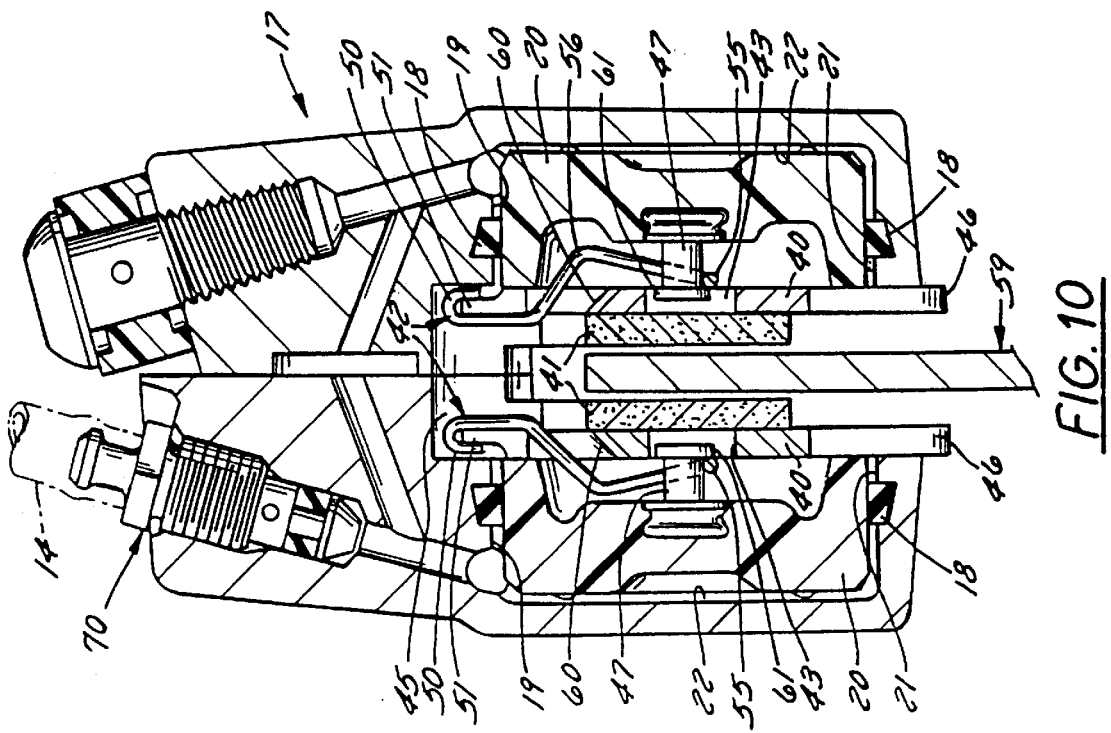
FIG. 11 is a view of the brake pad partially installed in the housing showing the deflection of the pad retention spring.

A piston post 47 is partially embedded in each of the pistons 20. A cap 61 is provided on the end of the post 47. The friction pad and plate assembly 38 is connected to the piston 20 by sliding the back plate assembly 38 upward so that the U-shaped loop 55 engages the post 47 and is retained thereon by cap 61. A recess 43 is provided in the plate 40 which is aligned with the post 47 on the piston 20. The plate assembly 38 is positioned on the piston 20 by sliding the back plate assembly 38 into the slot 45 with the U-shaped loop 55 aligned with the cap 61. The tab 46 is lifted as shown in FIG. 11. The spring 42 is deflected and the piston post 47 is clear of the friction pad plate hole edge 44. The friction pad and back plate assembly 38 can be slid out of the bottom of the caliper housing as shown in FIG. 13. This is the only avenue of escape for the pad as the other three sides are closed.

During insertion of the pads as shown in FIG. 12, the left side of the pad is slid up until the beveled section 56 of the pad 38, ramps over the piston post 47. The post 47 engages the spring 42, deflecting it away from the pad plate 40. The pad 38 continues sliding until the plate 46 snaps over the post 47. The pad is then pulled into contact with the piston face by spring 42 and the plate hole 43 captures the piston post 47. Once the wheel and disk assembly 39 are reinserted into the forks 42, the pads are trapped from lifting out of piston engagement and thus cannot escape.

Figure 14:
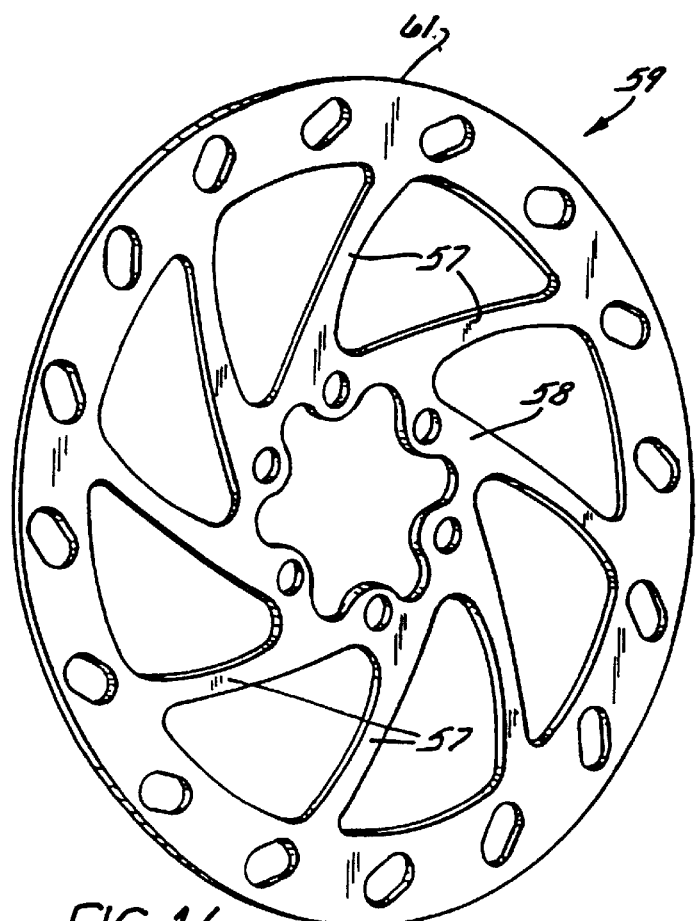
FIG. 14 shows the thermally compliant brake disk.

A thermally compliant lightweight brake disk 59, as shown in FIG. 14, is designed to prevent yielding which can cause warping or fracture under combined thermal and high torque loading. The friction contact ring 61 is supported by a number of curved legs 57 which are formed in the circular area 58. The legs 57 are shaped in such a way as to bend to comply with the outer ring's desire to expand when heated. This prevents high stress concentration on the legs 57 and avoids yielding. The legs 57 are also designed to be strong enough to withstand exceptionally high braking torque. Finally, the legs 57 are shaped to provide adequate axial bending but strength enough to prevent impact damage. It is important that the disk remains flat when not in use.

Figure 15:
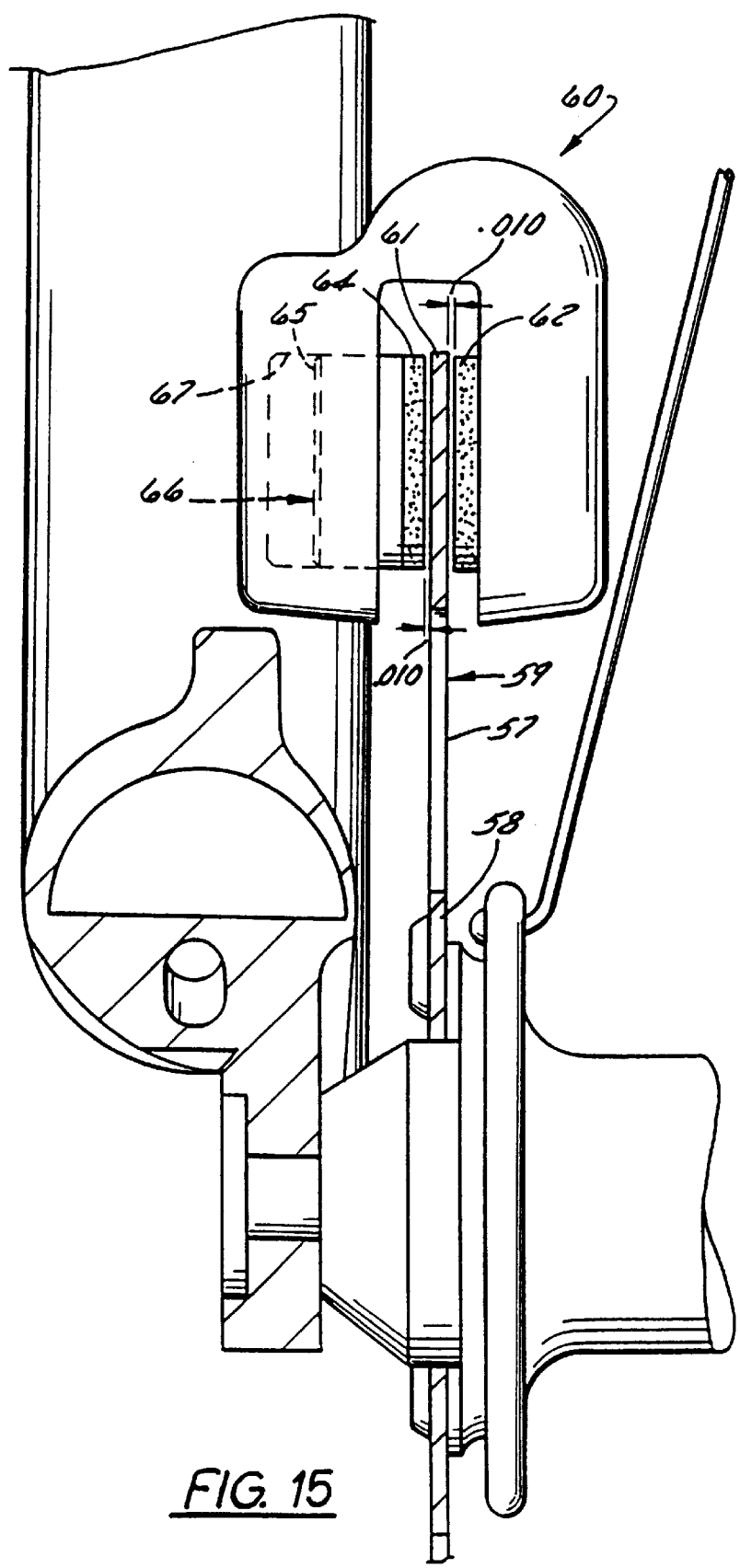
FIG. 15 is a cross-section view of a fixed pad single acting caliper assembly.

Referring to FIG. 15, a fixed mount single acting caliper 60 is shown mounted on the bicycle frame in a position to straddle the lightweight brake disk 59. The caliper 60 is set up on the frame with a clearance of 0.010 inch between fixed pad 62 and the disk 59. The brake actuator 66 is positioned on the mount side with the moveable pad 64 positioned to engage the disk 59 after 0.010 movement. When the brake actuator 66 is applied, the moveable pad 64 closes the 0.010 gap, contacts the ring 61, flexes the ring 61 into contact with the fixed pad 62 and progressive frictional clamping occurs. Upon release of the moveable pad, the ring 61 returns to its home position with a clearance of 0.010 inch between the ring 61 and the pad 62 and between the ring 61 and the pad 64. With this arrangement, zero drag is provided on each side of the disk due to its flexibility and the resultant clearance.

Figure 16:
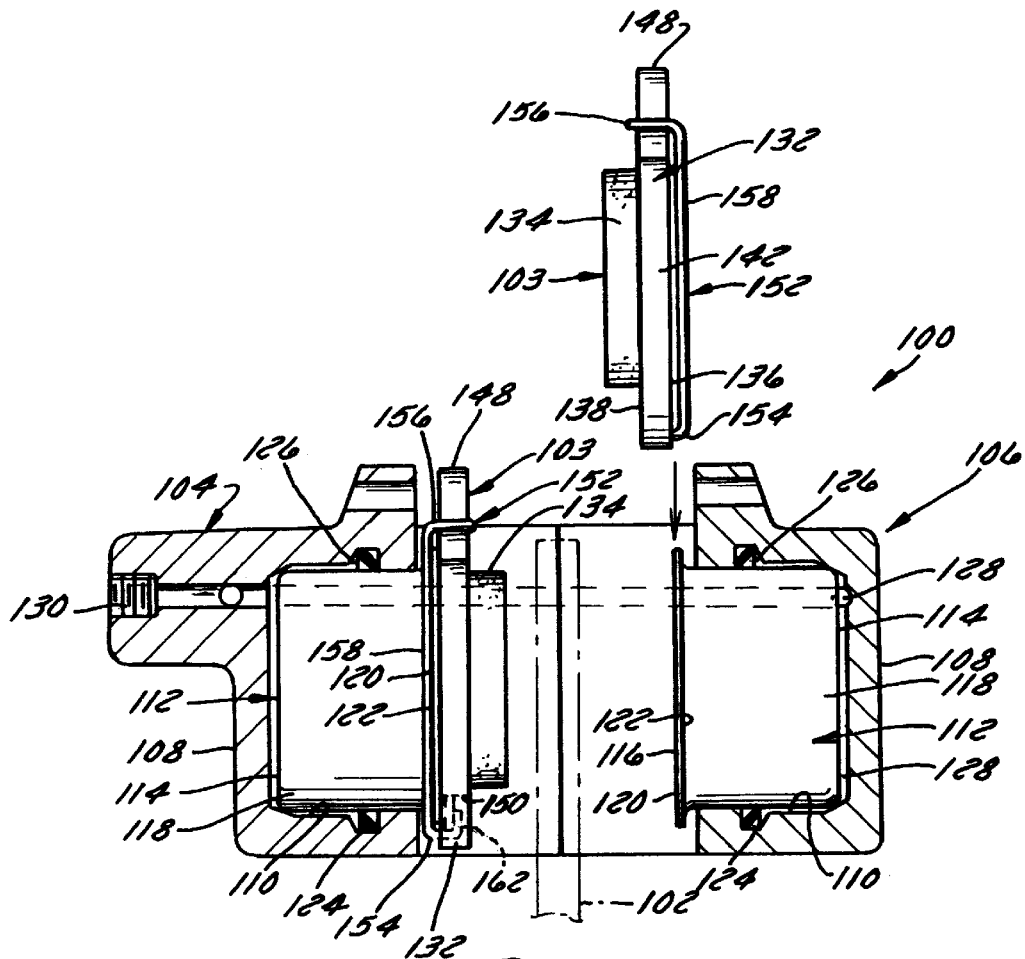
FIG. 16 is a sectional side elevation of a disc brake assembly constructed in accordance with another embodiment of the invention and illustrating a brake pad/pad holder subassembly of the brake assembly in a position in which it is poised for installation into the brake assembly.
Figure 17:
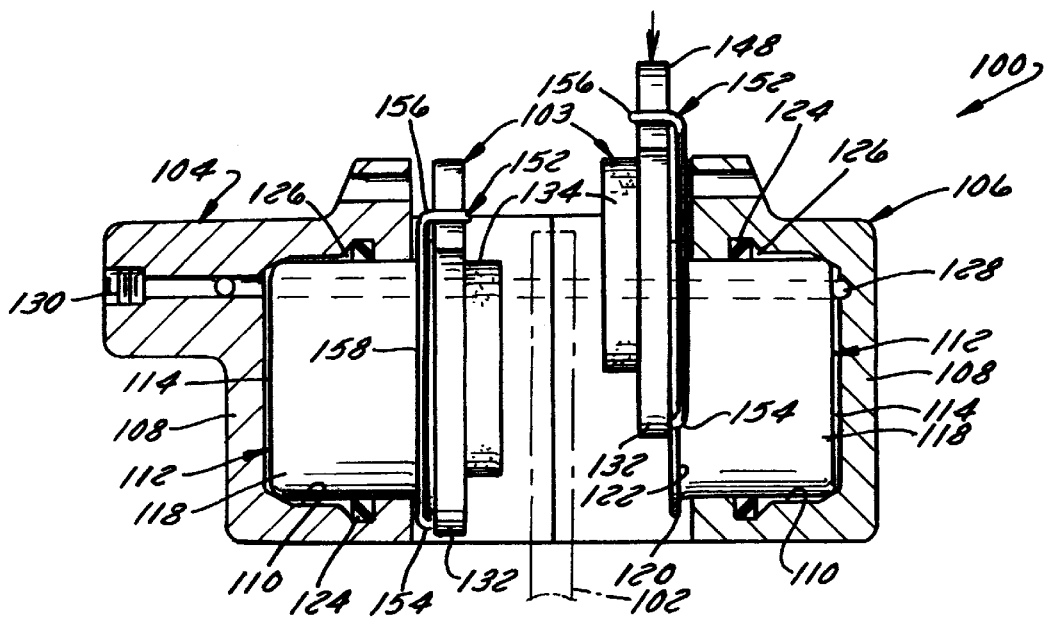
FIG. 17 corresponds to FIG. 16 and illustrates the pad/pad holder subassembly in a partially-installed position.
Figure 18:
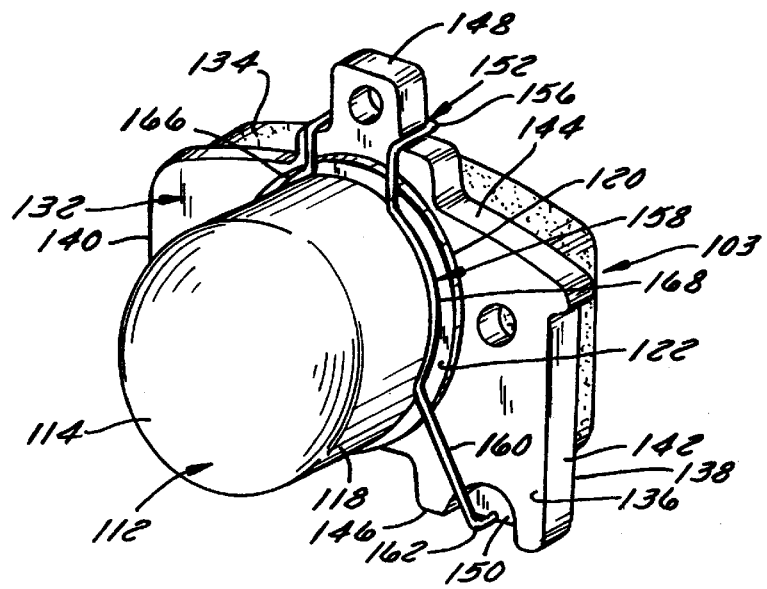
FIG. 18 is a perspective view of the pad/pad holder assembly of FIG. 17 in a position in which it is filly mounted onto an associated piston of the assembly.
Figure 19:
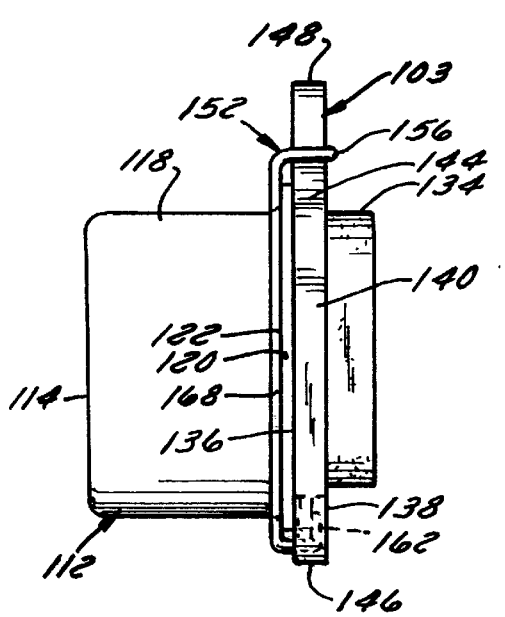
FIG. 19 is a side elevation view of the assembly components of FIG. 18.
Figure 20:
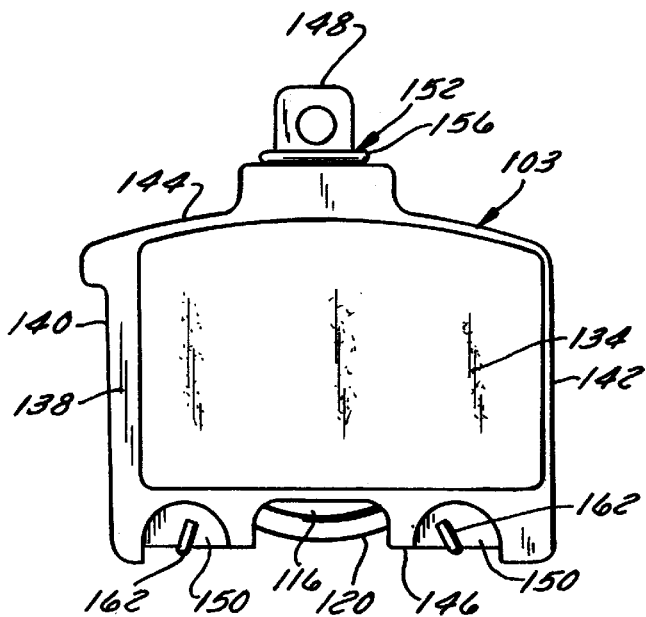
FIG. 20 is a front elevation view of the components of FIGS. 18 and 19.
Figure 21:
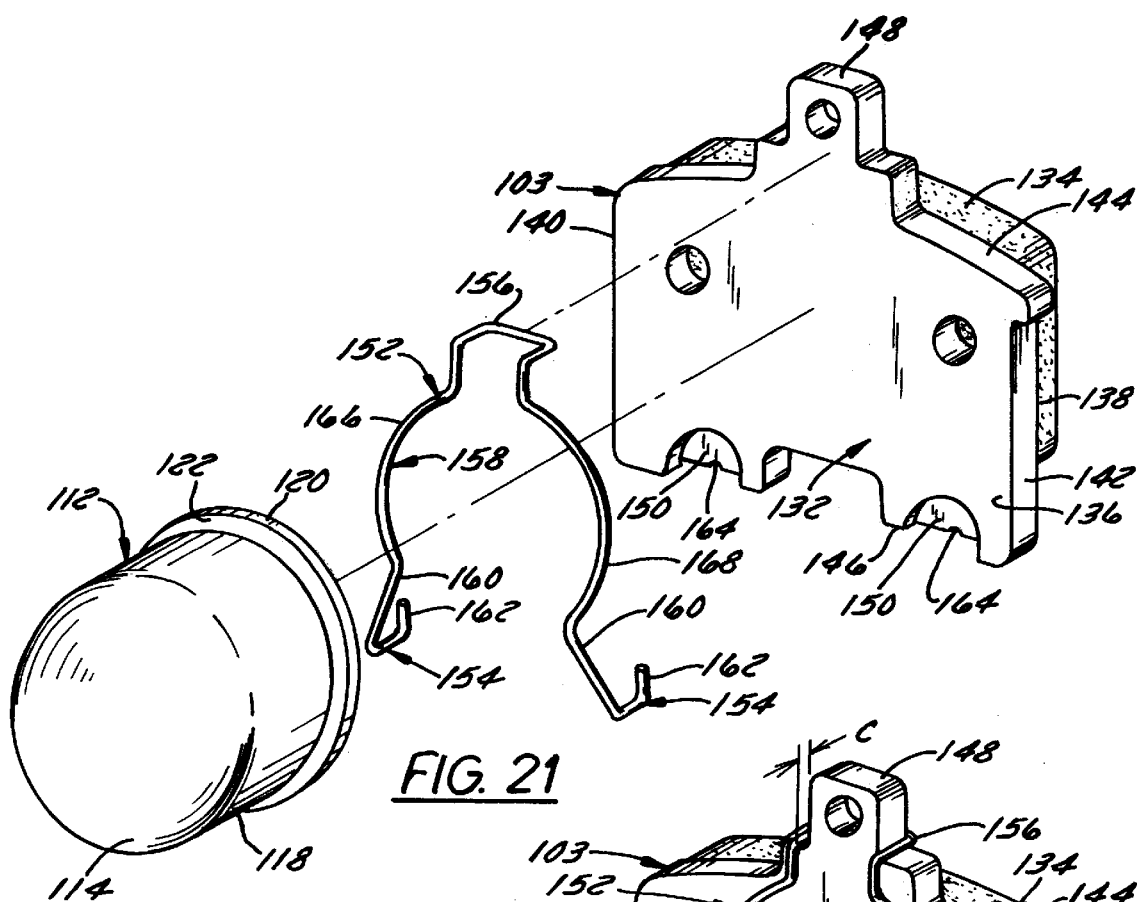
FIG. 21 is an exploded perspective view of the subassembly of FIGS. 18–20.

Referring now to FIGS. 16–22, a disc brake assembly 100 constructed in accordance with another embodiment of the invention is illustrated. The assembly 100 incorporates an improved pad holder 152 that holds a pad 103 of the assembly 100 tightly against the associated piston 112. Referring initially to FIGS. 16 and 17, the assembly 100 includes a disc 102, a pair of pads 103, and a pair of fixed calipers 104 and 106 constructed generally as discussed above in conjunction with FIGS. 12–15. Hence, the calipers 104 and 106 are clamped together with the disc 102 sandwiched between them. Each caliper 104 or 106 includes a housing 108 having an internal bore 110 that slidably receives a piston 112 forming the caliper's brake actuator.

Each piston 112 is relatively simple in construction and, advantageously, can be stamped to minimize costs. It includes a closed rear axial end 114, an open front axial end 116, and a cylindrical peripheral surface 118 extending from the front end 116 to the rear end 114. An annular flange 120 is stamped or otherwise formed on the outer peripheral surface 118 at or near the front end 116 to present an annular axial surface 122 which serves as a seat for the pad holder 152. The outer peripheral surface 118 of the piston 112 is sealed in the bore 110 via an elastameric seal 124 captured in a groove 126 in the wall of the bore 110. Seal 124 preferably is configured to grip the piston 112 and elastically deflect upon piston movement so that, upon the release of actuating forces on the piston 112, the seal 124 returns to its original shape to return the piston 112 to the retracted position illustrated in FIGS. 16–20, thereby obviating the need for a return spring. Seals of this type are well known and are available in braking systems manufactured by Hayes Brake, LLC of Mequon, Wis. A chamber 128 is formed between the rear end 114 of the piston 112 and an inner axial end of the bore 110. Chamber 128 can be selectively pressurized with hydraulic fluid that is introduced into the caliper 104 or 106 via a port 130 to drive the piston 112 towards the disc 102 to apply the brakes.

Referring to FIGS. 16–22, each pad 103 includes a metal back plate 132 and a friction pad 134 made from a suitable friction material. The back plate 132 has a relatively flat rear surface 136, a relatively flat front surface 138, and left, right, upper, and lower side edges 140, 142, 144, and 146, respectively. The friction pad 134 is glued or otherwise affixed to the front surface 138 of the back plate 132. A tab 148 extends upwardly from the upper edge 144 of the back plate 132. The back plate 132 is also indented adjacent to the bottom edge 146 thereof at both its inner and outer surfaces to form receptacles 150.

Referring to FIGS. 18–22, the pad 103 is securely clamped to the piston 112 by a pad holder 152. The pad holder 152 is configured to permit the pad 103 to be installed in the assembly 100 and removed from the assembly without using any special tools and without disassembling the brake system in any way. Towards these ends, the pad holder 152 takes the form of a simple spring clip that is preferably formed from a single piece of spring wire or "wire form."The wire form 152 includes a pair of free ends 154 disposed adjacent the lower edge 146 of the back plate 132, a loop 156 disposed adjacent the upper edge 144 of the back plate 132, and a piston engaging portion 158 that is disposed between the loop 156 and the free ends 154 and that is configured to extend substantially in parallel with the rear surface 136 of the back plate 132. Each of the free ends 154 includes (1) an inclined section 160 that extends at a relatively shallow angle from an associated end of the piston engaging portion 158 to the bottom edge 146 of the back plate 132, and (2) a hook 162 that extends downwardly from the bottom end of the inclined section 160 and that hooks into an associated receptacle 150 of the back plate 132. The loop 156 clips over the tab 148 on the back plate 132 to hold the upper end of the wire form 152 in place. The loop 156 and the hooks 162 are loosely clipped onto the back plate 132 so that, when the pad holder 152 is mounted on the pad 103, a slight clearance C (FIG. 22) is formed between the wire form 152 and the rear surface 136 of the back plate 132. The thickness of this clearance C is slightly less than the thickness of the flange 120 on the piston 112 require deflection of the wire form 152 axially of the piston 112 to accommodate passage of the flange 120 between the wire form 152 and the back plate 132.

In this embodiment, the piston engaging portion 158 of the wire form 152 includes two piston engaging sections 166 and 168, each of which wraps part-way around a respective side of the piston 112. The piston engaging sections 166 and 168 are curved with a radius of curvature that generally matches the radius of curvature of the piston 112. However, the maximum undeflected distance between the sections 166 and 168 is less than the diameter of the outer peripheral surface 118 of the piston 112 so that the wire form 152 must deflect radially when the pad 103 is inserted into the assembly 100. This combination of radial and axial deflection minimizes or even eliminates movement of the pad 103 relative to the piston 112 both axially and radially, thereby preventing drag and rattle as well as unintended pad removal.

Figure 22:
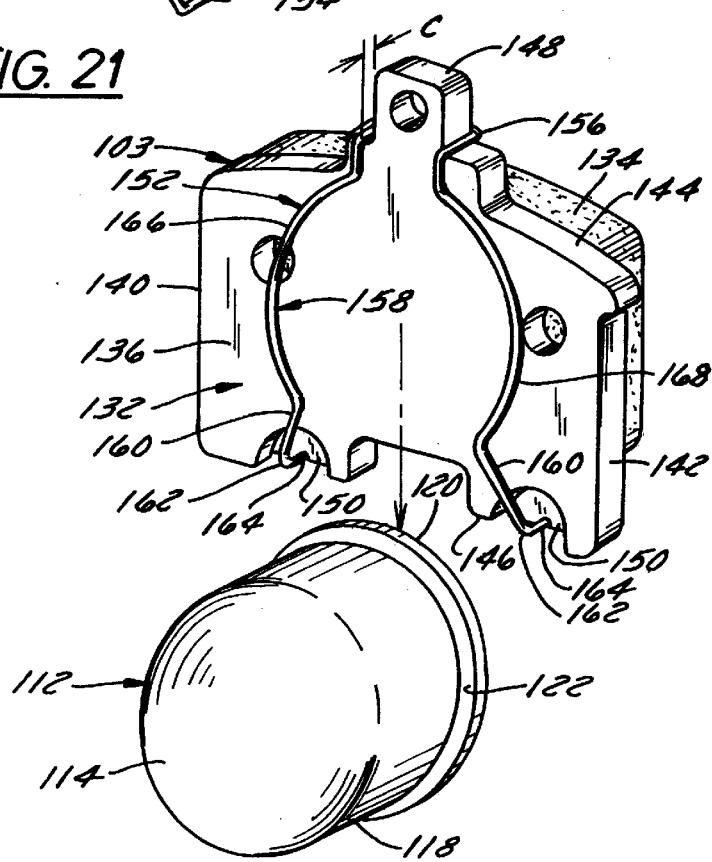
FIG. 22 is a partially exploded perspective view of the components of FIGS. 19–21, illustrating the pad/pad holder subassembly in a position in which it is ready for mounting on the piston.
Figure 23:
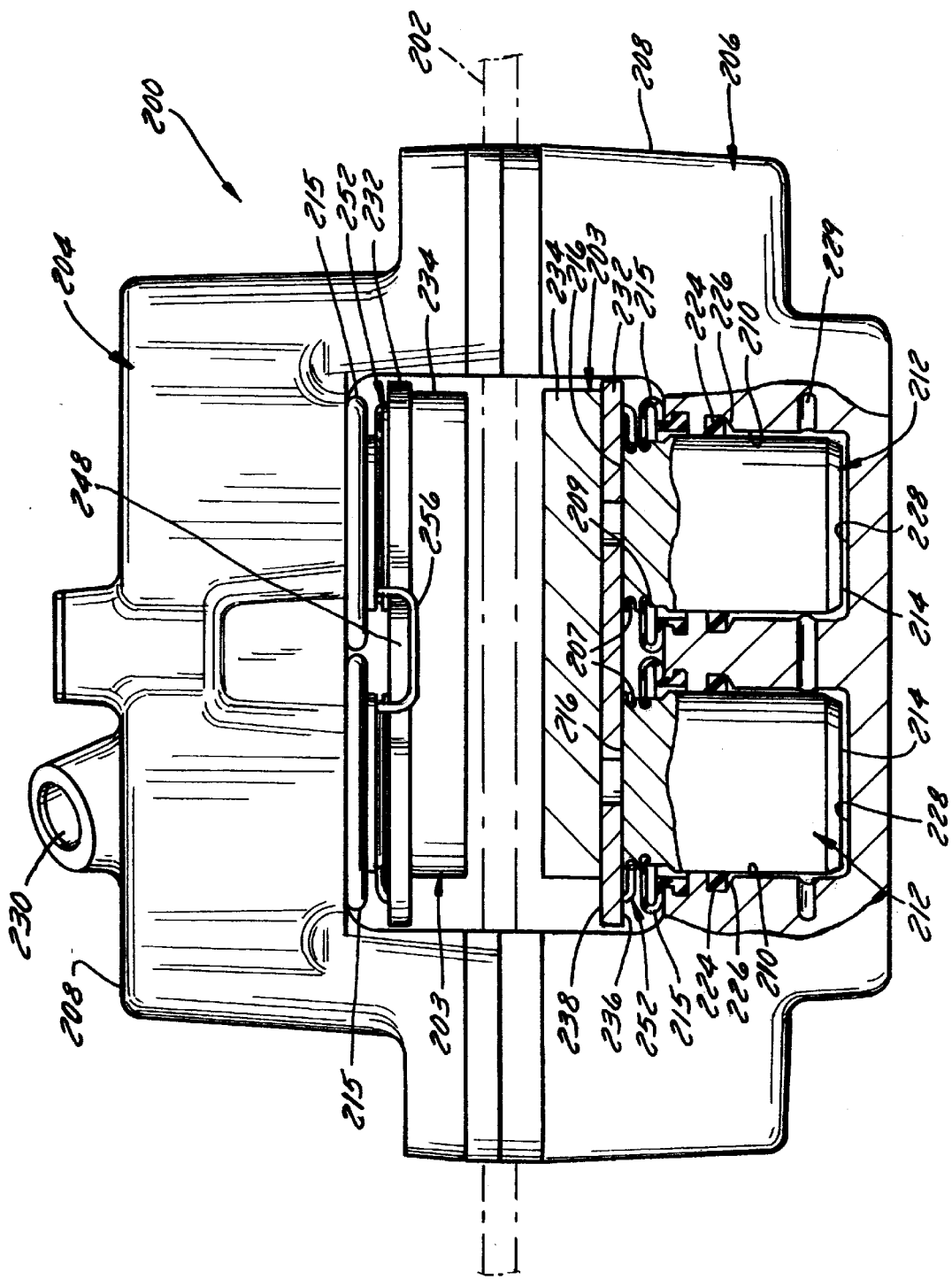
FIG. 23 illustrates a dual piston, fixed caliper disc brake assembly constructed in accordance with another embodiment of the invention.
Figure 24:
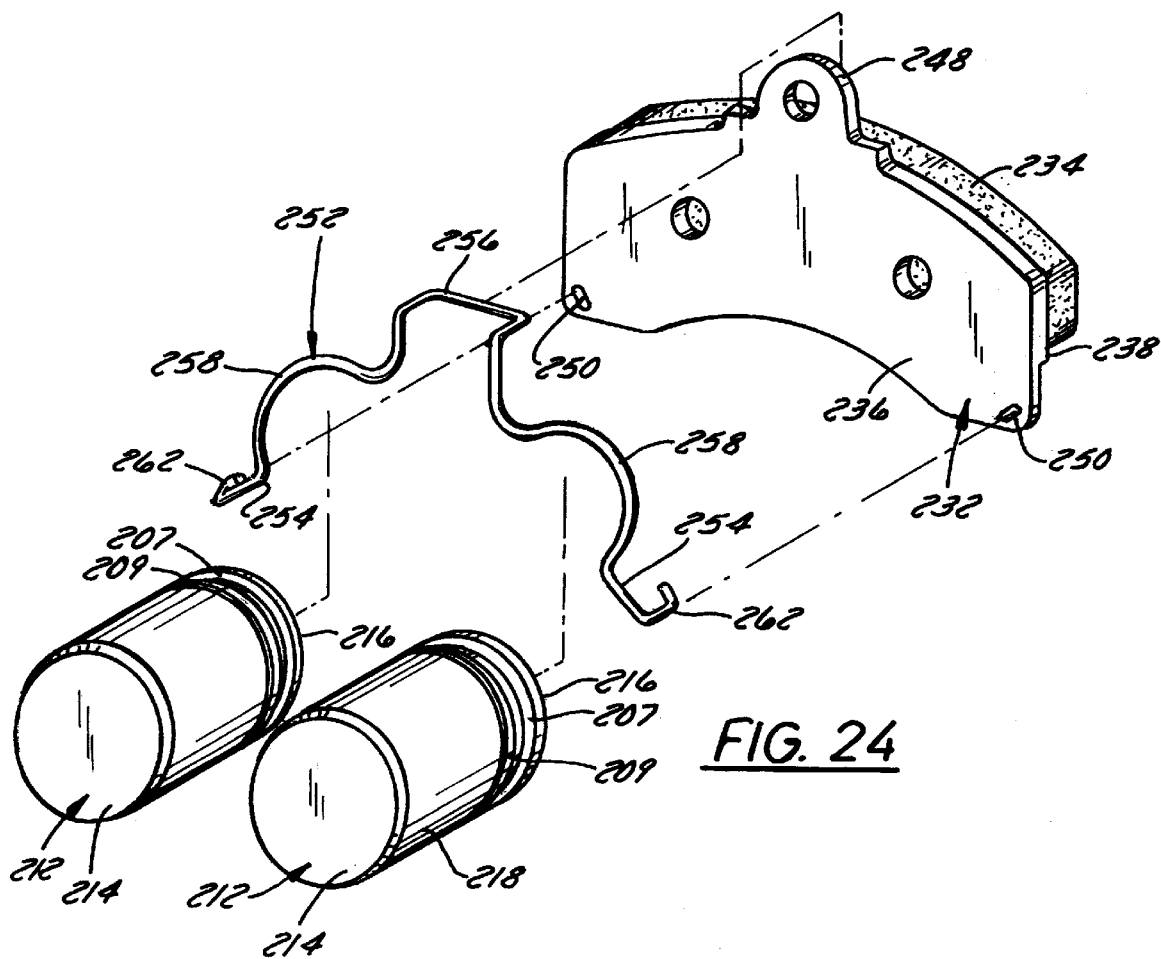
FIG. 24 is an exploded perspective view of a pad, pad holder, and associated pistons of the assembly of FIG. 23.
Figure 25:
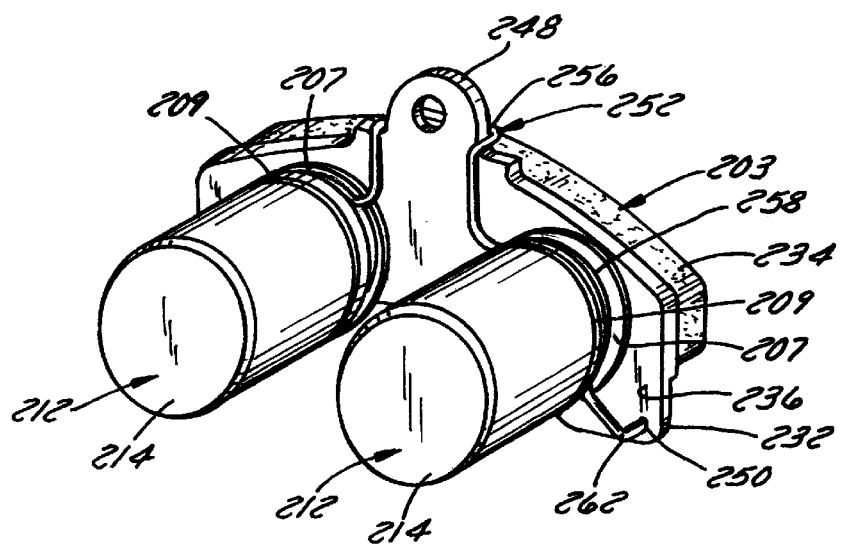
FIG. 25 is an exploded assembled view of the components of FIG. 24.
Figure 26:
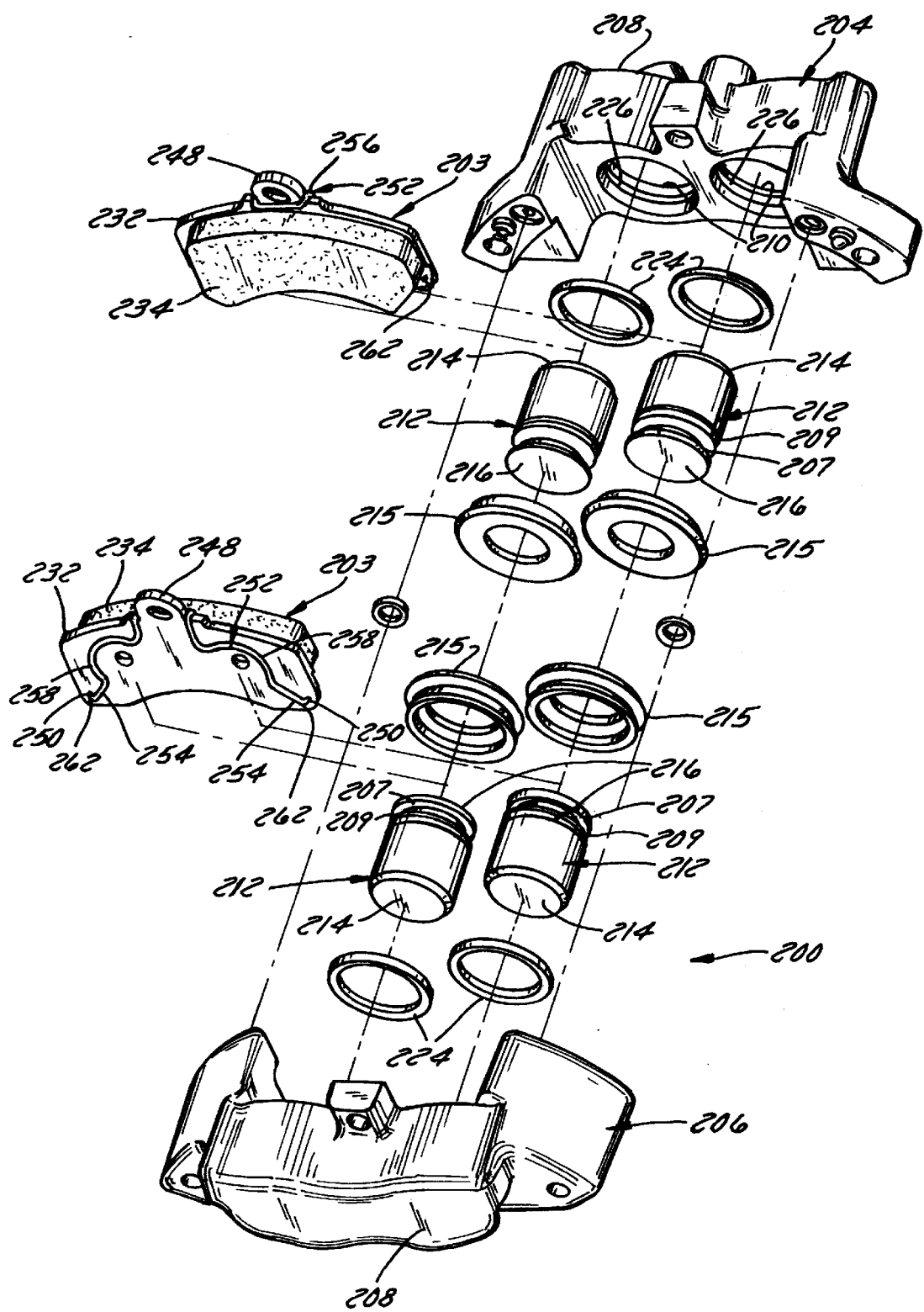
FIG. 26 is an exploded perspective view of the disc brake assembly of FIGS. 23–25.

Referring now to FIGS. 15, 16, 21, and 22, the pad 103 is readied for installation simply by clipping the loop 156 over the tab 148 on top of the back plate 132 and clipping the hooks 162 onto the receptacles 150 on the bottom edge 146 of the back plate 132 as illustrated in FIG. 22. The proper positioning of the hooks 156 in the receptacles 150 may be facilitated by providing notches 164 (best seen in FIG. 21) in the receptacles 150 for receiving the bottom legs of the hooks 156. This operation does not require any special tools. Next, the pad and pad holder subassembly are installed in the brake assembly 100 simply by pushing that subassembly radially downwardly onto the piston 112 from the position illustrated in FIG. 16 to the position illustrated in FIG. 17. As discussed above, the wire form 152 deflects radially and axially when the pad 103 is pushed downwardly during this movement so that the pad 103 is firmly clamped to the front axial surface 116 of the piston 112. The pad 103 can be removed from the assembly simply by reversing the operation. That is, the pad/pad holder subassembly are pulled radially upwardly as viewed in the drawings under retraction forces that are of a sufficient magnitude to deflect the wire form 152 and to permit pad removal. No caliper removal or disc removal is required. Nor are any specials tools required.

FIGS. 23–26 illustrate another embodiment of a disc brake assembly 200 incorporating a pad holder 252 having at least many of the beneficial operational characteristics of the pad holder 152 of the brake assembly 100 of FIGS. 16–22. Assembly 200 differs from the assembly 100 primarily in that it is configured for use with a vehicle such as a golf cart that undergoes a high duty cycle. The assembly 200 includes two heavy-duty calipers 204, 206, each of which includes a housing 208 having bores 210 formed therein that receive two pistons 212. Each piston 212 has a pair of grooves 207, 209 formed near its front end 216, one (207) of which receives a pad holder 252 and one (209) of which receives an elastameric boot 215 that seals the front end 216 of the piston 212 to the associated bore 210. A central portion of the outer periphery 218 of each piston 212 is sealed to the bore 210 via another seal 224 seated in a groove 226 in bore 210. As in the previous embodiment, the pistons 212 are actuated via hydraulic pressure introduced into chambers 228 located behind the rear surfaces 214 of the pistons 212 and supplied with hydraulic fluid via passages 229.

The brake pad 203 differs from the pad 103 of the embodiment of FIGS. 16–22 primarily that is somewhat larger than the pad 103 so as to be driven by two pistons, as is required for some heavier duty braking applications. The pad 203 includes a back plate 232 and a friction pad 234 secured to the front surface of the back plate 232. The pad 203 is clipped onto both pistons 212 using a single spring clip 252 that, in effect, performs all of the functions of two spring clips 152 of the embodiment of FIGS. 16–22. The clip includes an upper loop 256, two lower free ends 254 terminating in hooks 262, and a pair of piston engagement portions 258 each of which is formed from a semi-circular ring segment extending through an arc of over 90 degrees from the associated hook 262 to a respective end of the upper loop 256 of the wire form 252.

The pad/pad holder subassembly of this embodiment is installed and removed from the brake assembly 200 in much the same manner as described above in connection with the embodiment of FIGS. 16–22. Hence, the wire form 252 is first clipped onto a rear surface 236 of the back plate 232 of the pad 203 by hooking the loop 256 over a tab 248 on the back plate 232 and by clipping the hooks 262 on the free ends 254 into apertures forming the receptacles 250 of the back plate 232. Then, the pad/pad holder subassembly is forced radially downwardly so that the piston engaging portions 258 slide into the grooves 207 in the pistons 212 and snap into place. The wire form 252 deflects both axially and radially during this process, thereby securely holding the pad 203 in place against the front surfaces 216 of the pistons 208. The pad 203 can be removed for service or replacement simply by gripping the tab 248 and pulling it upwardly with sufficient forces to overcome the retention force imposed by the wire form 252.

Many changes and modifications can be made in the invention without departing from the spirit thereof. The scope of some of these changes is discussed above. The scope of the remaining changes will be apparent from the appended claims.

We claim:

1. A disc brake assembly comprising:
   (A) a disc;
   (B) a caliper;
   (C) a piston which has a rear end slidably mounted in a bore in said caliper and a front end which faces said disc;
   (D) a brake pad which is disposed between said piston and said disc; and
   (E) a pad holder which holds said pad on said front end of said piston, said pad holder comprising a spring clip which is clipped to said pad and which engages an axial surface of said piston to draw said pad towards said front end of said piston, wherein said spring clip comprises a wire form which has a substantually open end and a substantially closed end, and wherein said pad and said pad holder are attachable to said piston by sliding the open end of said wire form radially over said piston against spring forces imposed by deflection of said wire form.

2. A disc brake assembly comprising:
   (A) a disc;
   (B) a caliper;
   (C) a piston which has a rear end slidably mounted in a bore in said caliper and a front end which faces said disc;
   (D) a brake pad which is disposed between said piston and said disc; and
   (E) a pad holder which holds said pad on said front end of said piston, said pad holder comprising a spring clip which is clipped to said pad and which engages an axial surface of said piston to draw said pad towards said front end of said piston, wherein said pad comprises 1) a back plate having front and rear surfaces and 2) a friction pad mounted on said front surface of said back plate, and wherein said spring clip comprises a wire form which has 1) a pair of free ends which are disposed adjacent a lower edge of said back plate and which are connected to said back plate and 2) a loop which is disposed adjacent an upper edge of said back plate and which is connected to said back plate, and wherein a piston engaging portion of said wire form which is disposed between said loop and said free ends engages said axial surface of said piston.

3. A disc brake assembly as defined in claim 2, wherein said caliper is a single piston caliper, wherein said wire form has only a single piston engaging portion, and wherein said piston engaging portion includes two spaced piston engaging sections, each of which cooperates with an associated side of said piston.

4. A disc brake assembly as defined in claim 3, wherein said axial surface of said piston is formed from a flange on said piston.

5. A disc brake assembly as defined in claim 2, wherein at least part of said piston engaging portion has a radius of curvature which at least generally matches a radius of curvature of said piston.

6. A disc brake assembly comprising:
   (A) a disc;
   (B) a caliper;
   (C) a piston which has a rear end slidably mounted in a bore in said caliper and a front end which faces said disc;
   (D) a brake pad which is disposed between said piston and said disc; and
   (E) a pad holder which holds said pad on said front end of said piston, said pad holder comprising a spring clip which is clipped to said pad and which engages an axial surface of said piston to draw said pad towards said front end of said piston, wherein said spring clip comprises a wire form which has a substantually open end and a substantially closed end, and wherein said open end of said wire form terminates in hooks that engage at least one of apertures and notches in said pad.

7. A disc brake assembly comprising:
   (A) a disc;
   (B) a caliper;
   (C) a piston which has a rear end slidably mounted in a bore in said caliper and a front end terminating in an axial surface which faces said disc;
   (D) a brake pad which is disposed between said piston and said disc and which has a back plate having a relatively flat rear surface, a front surface, and upper and lower opposed edges connecting said front surface to said rear surface, wherein a tab extends from said upper edge and clip receptacles are formed in said back plate adjacent said lower edge; and
   (E) a pad holder which holds said pad on said front end of said piston, said pad holder comprising a wire form which is clipped to said back plate and which engages an axial surface of said piston, wherein said wire form has
      (1) a pair of free ends which are disposed adjacent said lower edge of said back plate and which terminate in hooks which hook onto said clip receptacles,
      (2) a loop which is disposed adjacent said upper edge of said back plate and which is clipped onto said tab, and
      (3) a piston engaging portion which wraps around at least a substantial portion of an outer radial periphery of said piston and which engages an axial surface on said piston to draw said rear surface of said back plate against said front end of said piston.

8. A disc brake assembly as defined in claim 7, wherein said caliper is a single piston caliper, and wherein said piston engaging portion of said wire form includes two piston engaging sections, each of which cooperates with an associated side of said piston.

9. A disc brake assembly as defined in claim 7, wherein each of said clip receptacles includes at least one of an indent and a notch in said pad.

10. A method comprising
(A) retaining a brake pad in a disc brake assembly using a pad holder, wherein said pad holder comprises a wire form having a piston engaging portion, said brake assembly including a disc and a caliper which faces said disc and which supports said pad; then
(B) removing said pad from said brake assembly, without detaching said pad holder from said pad and without removing said caliper or said disc from said brake assembly, by pulling said pad at least generally radially relative to said caliper with a removal force that overcomes a retention force imposed on said pad by said pad holder.

11. A method as defined in claim 10, wherein said pad holder comprises a spring clip, and wherein, during the retaining step, said spring clip draws said pad tight against a piston of said caliper so that said pad and piston move together as a unit.

12. A method as defined in claim 11, wherein, when said piston extends horizontally, the removing step comprises pulling said pad at least generally vertically upwardly with a force that overcomes a retention force imposed by said pad holder.

13. A method comprising
(A) retaining a brake pad in a disc brake assembly using a pad holder, wherein said pad holder comprises a wire form having a piston engaging portion, said brake assembly including a disc and a caliper which faces said disc and which supports said pad; then
(B) removing said pad from said brake assembly, without detaching said pad holder from said pad and without removing said caliper or said disc from said brake assembly, by pulling said pad at least generally radially relative to said caliper with a removal force that overcomes a retention force imposed on said pad by said pad holder, wherein said pad holder comprises a spring clip, and wherein, during the retaining step, said spring clip draws said pad tight against a piston of said caliper so that said pad and piston move together as a unit, wherein the retaining step comprises forcing said piston engaging portion over said piston.

14. A disc brake assembly comprising:
(A) a disc;
(B) a caliper;
(C) a piston which has a rear end slidably mounted in a bore in said caliper and a front end which faces said disc;
(D) a brake pad which is disposed between said piston and said disc; and
(E) a pad holder which holds said pad on said front end of said piston, said pad holder comprising a spring clip which is clipped to said pad and which engages an axial surface of said piston to draw said pad towards said front end of said piston, wherein said spring clip has a substantially open end and a substantially closed end, and wherein said subsantially open end terminates in at least one hook that releasably hooks onto said pad.

15. A method comprising
(A) retaining a brake pad in a disc brake assembly using a pad holder, wherein said pad holder comprises a spring clip having a piston engaging portion and at least one hook that is formed on an open distal end of said spring clip and that releasably hooks onto said pad, said brake assembly including a disc and a caliper which faces said disc and which supports said pad; then
(B) removing said pad from said brake assembly, without detaching said pad holder from said pad and without removing said caliper or said disc from said brake assembly, by pulling said pad at least generally radially relative to said caliper with a removal force that overcomes a retention force imposed on said pad by said pad holder, and wherein, during the retaining step, said spring clip draws said pad tight against a piston of said caliper so that said pad and said piston move together as a unit, wherein the retaining step comprises forcing said piston engaging portion over said piston.

\* \* \* \* \*